(12) United States Patent
Hepworth et al.

(10) Patent No.: US 10,400,092 B2
(45) Date of Patent: Sep. 3, 2019

(54) CELLULOSE PLATELET COMPOSITIONS, METHODS OF PREPARING CELLULOSE PLATELET COMPOSITIONS AND PRODUCTS COMPRISING SAME

(71) Applicants: CELLUCOMP LIMITED, Burntisland Fife (GB); COSUN BIOBASED PRODUCTS B.V., Breda (NL)

(72) Inventors: David Hepworth, Burntisland Fife (GB); Eric Whale, Burntisland Fife (GB)

(73) Assignees: CELLUCOMP LIMITED, Fife, Scotland (GB); COSUN BIOBASED PRODUCTS B.V., Breda (NL)

( * ) Notice: Subject to any disclaimer, the term of this patent is extended or adjusted under 35 U.S.C. 154(b) by 92 days.

(21) Appl. No.: 15/814,075

(22) Filed: Nov. 15, 2017

(65) Prior Publication Data
US 2018/0134877 A1 May 17, 2018

Related U.S. Application Data

(63) Continuation of application No. 14/381,813, filed as application No. PCT/GB2013/050501 on Feb. 28, 2013, now Pat. No. 9,834,664.

(30) Foreign Application Priority Data

Mar. 1, 2012 (GB) .................................. 1203651.3

(51) Int. Cl.
C08L 1/02 (2006.01)
C08H 8/00 (2010.01)
(Continued)

(52) U.S. Cl.
CPC .................. *C08L 1/02* (2013.01); *C08H 8/00* (2013.01); *C09D 5/024* (2013.01); *C09D 7/43* (2018.01);
(Continued)

(58) Field of Classification Search
None
See application file for complete search history.

(56) References Cited

U.S. PATENT DOCUMENTS 4,831,127 A * 5/1989 Weibel ..................... D21C 5/00
106/163.01
4,968,385 A * 11/1990 Amador ................... D21C 1/06
162/18
(Continued)

FOREIGN PATENT DOCUMENTS

CN 101103046 1/2008
DE 3915544 12/1989
(Continued)

*Primary Examiner* — Melvin C. Mayes
*Assistant Examiner* — Colette B Nguyen
(74) *Attorney, Agent, or Firm* — BakerHostetler

(57) ABSTRACT

A composition and method of preparing a composition is presented wherein the composition comprises cellulose platelets and the cellulose platelets comprise at least 60% cellulose by dry weight, less than 10% pectin by dry weight and at least 5% hemicellulose by dry weight. The composition can be concentrated to at least 25% by weight solids content by pressing under low pressure, whilst retaining the ability to be re suspended within an aqueous medium. The resulting aqueous medium obtains the desired properties of the composition, such as increased viscosity or increased dispersion of pigment particles, for example, to the same extent as the composition before pressing.

6 Claims, 5 Drawing Sheets

(51) Int. Cl.
 *C09D 5/02* (2006.01)
 *C09D 163/00* (2006.01)
 *D21C 1/06* (2006.01)
 *D21C 3/02* (2006.01)
 *D21H 11/06* (2006.01)
 *D21H 15/02* (2006.01)
 *D21H 15/08* (2006.01)
 *C09D 7/43* (2018.01)
 *C09D 7/45* (2018.01)
 *C09D 7/65* (2018.01)
 *C09D 7/40* (2018.01)

(52) U.S. Cl.
 CPC ............... *C09D 7/45* (2018.01); *C09D 7/65* (2018.01); *C09D 7/70* (2018.01); *C09D 163/00* (2013.01); *D21C 1/06* (2013.01); *D21C 3/02* (2013.01); *D21H 11/06* (2013.01); *D21H 15/02* (2013.01); *D21H 15/08* (2013.01); *C08L 2205/02* (2013.01); *C08L 2205/14* (2013.01)

(56) References Cited

U.S. PATENT DOCUMENTS

| | | | |
|---|---|---|---|
| 5,767,176 | A | 6/1998 | Nakanishi et al. |
| 5,964,983 | A | 10/1999 | Dinand et al. |
| 6,602,994 | B1* | 8/2003 | Cash ................ A61K 8/027 536/100 |
| 8,454,836 | B2 | 6/2013 | Chase et al. |
| 2007/0062855 | A1* | 3/2007 | Chase ............. B01D 17/0202 210/263 |
| 2009/0062523 | A1* | 3/2009 | Malkki ................ C08H 8/00 536/56 |
| 2015/0203737 | A1* | 7/2015 | Van Engelen ........ C09K 8/206 507/104 |

FOREIGN PATENT DOCUMENTS

| | | |
|---|---|---|
| WO | WO 98/31871 | 7/1998 |
| WO | WO 2006/056737 | 6/2006 |
| WO | WO 2006/111604 | 10/2006 |
| WO | WO 2007/104990 | 9/2007 |
| WO | WO 2011/039423 | 4/2011 |

* cited by examiner

CELLULOSE PLATELET COMPOSITIONS, METHODS OF PREPARING CELLULOSE PLATELET COMPOSITIONS AND PRODUCTS COMPRISING SAME

CROSS REFERENCE TO RELATED APPLICATIONS

This application is a continuation of U.S. patent application Ser. No. 14/381,813, filed Aug. 28, 2014, now U.S. Pat. No. 9,834,664, which is a U.S. National Stage of International Patent Application No. PCT/GB2013/050501 filed Feb. 28, 2013, and claims the priority of Great Britain Patent Application No. 1203651.3 filed Mar. 1, 2012, all applications of which are incorporated by reference.

FIELD OF THE INVENTION

The invention relates to cellulose derived materials and their use as additives in a range of materials such as aqueous media (including emulsions) and solid materials (such as construction materials).

BACKGROUND TO THE INVENTION

It is known to reinforce materials such as plastics materials and epoxy resins, with coarse plant fibres from hemp and flax, for example. It is known to use the cellulose or cellulose fibres which make up the cell walls of the plant cells as an additive to bestow desired properties on a composition, for example, to increase the viscosity of an aqueous medium or emulsion. It is also known to use microfibrilar cellulose as an additive to modify the physical or chemical properties of a material. Microfibrilar cellulose is typically produced from plant cell walls, which comprise mostly cellulose, hemicellulose and pectin, which are broken down into their constituent cellulose fibres, and then further broken down into the individual microfibrils.

Typically, cellulose additives are broken down to microfibrils because of the high viscosity which can be achieved per unit weight of cellulose, which arises in part from the ability of cellulose microfibrils to form a lattice-type network within the medium to which they are added. For example, WO 2011/039423 (UPM-Kymmene Corporation) discusses the use of microfibrillar cellulose as an additive for concrete where the diameter of the microfibrils is preferably less than 1 µm.

Each stage of breaking down the cellulose involves a number of processes, including chemical treatment, homogenisation through either high shear mixing or through grinding, filtration and pressing. The larger the number of processes required, the more energy required to produce the end product.

One problem with microfibrillar cellulose is that it usually forms a gel or other solid at relatively low proportion by weight of solids. For example, microfibrillar cellulose of 5% by weight of solids is likely to form a solid. Therefore, in order to obtain a higher concentration, to allow a relatively small amount to be used as an additive in a large volume of media, for example, the microfibrillar cellulose must be compressed to force more of the water out of it. However, once dried, the cellulose microfibrils typically form inter-fibril bonds that must be broken if the cellulose microfibrils are to be suspended in aqueous media. In many compositions, resuspension is not possible if the composition is compressed too much (to 10% by weight of solids, for example). Accordingly, such compositions are often bulky and so inefficient and expensive to store or transport.

One method of overcoming this problem is disclosed in U.S. Pat. No. 5,964,983 (Dinand et al.) which discloses a suspension of microfibrillar cellulose which can be recreated after it has been dehydrated. However, rehydration of the disclosed microfibrillar cellulose requires the use of high shear mixing, where aggregates of microfibrils are effectively broken down again. Therefore, although the disclosure of Dinand et al. potentially provides microfibrillar cellulose for use as an additive that may be rehydrated, the cellulose high shear mixing is energetically expensive and cannot be used with emulsion paints or other composites which must not be subjected to high shear forces.

U.S. Pat. No. 4,831,127 (Weibel) discloses a method of separating out the cellulose and hemicellulose components from parenchymal cells whereby the cellulose component is in the form of platelets. The composition is made by heating the parenchymal cells to high temperatures (approximately 180° C.) and high pressures (approximately 300 pounds per square inch) whilst exposing the cells to extreme pH (either very high pH or very low pH) to remove as much hemicellulose as possible. The composition of Weibel following high shear homogenisation forms a stable homogeneous suspension having high viscosity and weak thixotropic character.

However, the cellulose compositions so formed are very difficult to rehydrate, due to the formation of internal hydrogen bonds between cellulose layers or fibres of the cellulose platelets during the dehydration process. Therefore, the cellulose composition of Weibel is not capable of being dehydrated to a useful concentration whilst still be able to be subsequently fully rehydrated.

Therefore, it is one object of the present invention to provide a cellulose composition and a method of producing a cellulose composition suitable for use as an additive that may be rehydrated using low shear forces.

It is an additional object of the invention to provide a cellulose composition and a method of producing a cellulose composition that has a relatively high viscosity in comparison with known cellulose compositions to allow smaller amounts of the composition to be added to a medium to achieve a given viscosity.

Many water-based materials, such as paints, for example, require separate additives to be added to thicken the water, to interact with the polymer, to prevent the pigment particles from settling out. The necessity to add many separate additives increases the cost of the resultant paint.

Accordingly, it is a further object of the invention to provide a cellulose composition that can perform two or more roles within a material to which it is added.

SUMMARY OF THE INVENTION

According to a first aspect of the invention, there is provided a composition comprising cellulose platelets characterised in that the cellulose platelets comprise at least 60% cellulose by dry weight, less than 10% pectin by dry weight and at least 5% hemicellulose by dry weight.

By "cellulose" we refer to homogeneous long chain polysaccharides found in plant cells consisting exclusively of glucose subunits and derivatives thereof. By "pectin" we refer to polysaccharides found in plant cells rich in galacturonic acid sub units and derivatives thereof. By "cellulose platelet" we refer to plant cells, sections of plant cells and/or sections of plant cell walls generally in the form of platelets. The plant cell wall material may have been treated, modified and/or some components may have been removed but the platelets have at no time been broken down to individual microfibrils, thereby losing the structure of plant cell wall sections. By "hemicellulose" we refer to heterogeneous polysaccharides found in plant cells consisting of a variety of subunits, excluding pectins, and derivatives thereof.

Typical cellulose fibre-based additives comprise either plant fibres, cellulose fibres or individual cellulose microfibrils, the constituents of the cellulose fibres. These additives are added to materials such as paints as a thickening agent or to prevent particles such as pigments settling out, or to plastics to provide strength, for example.

The reduction of plant fibres to the individual cells, and of plant cells to cellulose fibres and microfibrils is an energetically intense process, requiring chemical and mechanical action on the plant cells. The reduction of microfibrils to produce molecular cellulose by separating out the individual cellulose polymer chains requires further highly energetically intense processes, requiring the use of harsher and more extreme chemical and mechanical action on the microfibrils. Thus, by retaining cellulose in the form of cellulose platelets (comprising sections of plant cell walls) rather than breaking cellulose down to individual microfibrils or individual cellulose polymer chains the mechanical strength of plant cell wall sections can be retained whilst energy consumption can be minimised and harsh treatments minimised or avoided.

Once compositions comprising the cellulose species have been produced, it is often desirable to increase the concentration of the cellulose species to reduce the volume of the composition and thereby reduce storage and transport costs. In addition, the higher the concentration of the composition, the lower the amount that needs to be added to a material that it is required to supplement.

It is generally accepted in the art that the smaller the cellulose species, the higher the viscosity of an aqueous suspension of that cellulose species at a given concentration. Therefore, cellulose microfibrils produce a more viscous suspension than cellulose fibres or plant fibres.

Surprisingly, the inventors have found that cellulose platelets, which comprise cell walls and their networks of cellulose fibres and microfibrils produce a suspension of a viscosity comparable to known microfibril products. However, breaking plant-based pulp down into cellulose platelets involves fewer and gentler processes than to break the pulp down further into cellulose fibres and microfibrils, and therefore the cellulose platelets are more economical to produce, while producing a more viscous suspension.

Furthermore, microfibrillar cellulose typically forms a gel at concentrations of between 1 to 2% solids content by weight. For certain applications, such as increasing the viscosity of paints, it is highly undesirable for a gel to form within the paint. Therefore, microfibrillar cellulose must be used at a sufficiently low concentration to ensure that a gel is not formed.

The cellulose platelets of the present invention have been found not to form a gel even at high concentrations, therefore allowing the cellulose platelets to be concentrated to a higher solids content concentration, and thereby requiring a smaller volume of the composition to be added for a given increase in viscosity, for example. The cellulose platelets are also useful as a hardness modifier.

Microfibrillar cellulose and cellulose fibres are often stored as a solid or gel with a solids content by weight of around 1-2% cellulose. When added to a medium the gel or solid commonly requires strong agitation, such as high-shear mixing or grinding, for example, to break down the gel or solid and to disperse the broken down cellulose evenly throughout the medium.

Cellulose fragments when added to an aqueous medium have been found to produce suspensions of much lower viscosity if the fragments are pressed to form a concentrated composition, due in part to the deformation of the fragments during the pressing process and the resultant formation of internal hydrogen bonds between glucose residues. The so-formed hydrogen bonds are thought to prevent the deformed fragments from rehydrating fully from solids upon addition to aqueous media.

The inventors have found that the reduction of the pectin content of the cellulose platelets of the present invention allows pores within the structure of the cellulose platelets to be opened and to remain open during and after dehydration, thereby allowing water molecules to penetrate the cellulose platelets and aid in the rehydration of the cellulose platelets upon addition to aqueous media. As such, the cellulose platelets have been found to be much easier to rehydrate from solids than microfibrilar cellulose and cellulose fibres. Therefore, a composition of cellulose platelets according to the invention may be pressed to a higher concentration than previous compositions, reducing the volume of a given amount of cellulose platelets and thereby reducing storage and transport costs. In addition, a smaller volume of a higher concentration composition need be added to a given material to produce a given increase in viscosity, for example, thereby diluting the given material to a lesser degree. Preferably the composition comprises less than 5% or more preferably less than 2.5% of pectin by dry weight.

Nevertheless, we have found that it is advantageous to retain at least 5% of hemicellulose by dry weight as this provides an additional network, increasing viscosity but without adversely affecting the ability of the material to rehydrate. It may be the composition comprises at least 10% or at least 15% of hemicellulose by dry weight. Furthermore, the hemicellulose network holds the cellulose fibres together, thereby providing structural integrity and strength to the platelets, and ensuring that the pores in the platelets do not collapse during dehydration.

Preferably, the cellulose platelets within the composition form a uniform suspension from solids when added to an aqueous medium. The cellulose platelets within the aqueous medium may absorb water such that they swell. The cellulose platelets may absorb sufficient water to be up to 98% water by volume whilst retaining their structural integrity. An aqueous medium comprising swollen cellulose platelets may have a higher viscosity than a similar aqueous medium comprising cellulose platelets that are not swollen, or are not capable of becoming swollen.

Preferably, the cellulose platelets comprise at least 70% cellulose by dry weight.

The composition may comprise at least 12% cellulose platelet solids content by weight. Preferably, the composition comprises at least 20% cellulose platelets solids content by weight. The composition may comprise at least 25% cellulose platelets solids content by weight. The composition may comprise at least 30% cellulose platelets solids content by weight. The composition may comprise a surfactant. The surfactant may bind to the surface of the cellulose platelets such that when the composition is added to an aqueous medium, the cellulose platelets may form a uniform suspension. In embodiments where the composition comprises a surfactant, the composition may comprise at least 30% cellulose platelets solids content by weight, or at least 50% cellulose platelets solids content by weight.

Preferably, the composition can be rehydrated and re-dispersed into aqueous media with low shear mixing. For example, the composition may be rehydrated and re-dispersed into aqueous media using a stirrer with paddles rotating with a tip speed of 1.3 m/s.

Compositions known in the art typically require high shear mixing and may use saw tooth blades having an optimum circumference velocity of 18-25 m/s, for example. Such high shear mixing may be undesirable for emulsion paints, for example, where the emulsion may break down under high shear mixing.

Preferably, the cellulose platelets comprise at least 1.0 available hydrogen per glucose residue. Preferably, the cellulose platelets comprise at least 1.5 available hydrogen per glucose residue. Cellulose typically has approximately 0.5 available hydrogen per glucose residue. Therefore, it is possible to functionalise the glucose residues of the cellulose platelets according the current invention to a greater extent. By "available hydrogen per glucose residue", we refer to the hydroxyl groups ("OH" groups) of the glucose residues, which are available for proton transfer, or functionalisation. For example, the available hydrogen per glucose may be functionalised to give the cellulose a new physical or chemical property, or to change an existing physical or chemical property. Some hydroxyl groups are not available because they are located within the platelets where they are not in communication with the surrounding medium.

Preferably, the cellulose platelets have a median major dimension of at least 10 μm. The cellulose platelets may have a median major dimension of at least 50 μm. Preferably, the cellulose platelets have a median minor dimension of less than 1 μm. The cellulose platelets may have a median minor dimension of less than 0.5 μm. The cellulose platelets within a composition of cellulose platelets may have a mean major dimension of at least 50 μm. The cellulose platelets within a composition of cellulose platelets may have a mean major dimension of less 200 μm. Preferably, the cellulose platelets within a composition of cellulose platelets have a mean major dimension of less than 150 μm.

At least 50% of the cellulose platelets within a composition of cellulose platelets may have a major dimension between 20 and 90 μm. At least 70% of the cellulose platelets within a composition of cellulose platelets may have a major dimension between 20 and 90 μm. Preferably, at least 50% of the cellulose platelets within a composition of cellulose platelets have a major dimension between 30 and 80 μm. More preferably, at least 70% of the cellulose platelets within a composition of cellulose platelets have a major dimension between 30 and 80 μm.

Different applications of the composition of cellulose platelets may require different dimensions of cellulose platelets. The cellulose platelets within the composition of cellulose platelets may have a median major dimension of between 40 and 200 μm, dependent on the application the specific composition is to be used for. The cellulose platelets within the composition of cellulose platelets may have a median major dimension of between 60 and 150 μm. For each application, typically at least 50%, or more preferably, at least 70% of the cellulose platelets within a composition of cellulose platelets have a major dimension within plus or minus 50% of the median. For example, for a composition of cellulose platelets with a median major dimension of cellulose platelets of 80 μm, at least 70% of the cellulose platelets within that composition may have a major dimension of between 40 μm and 120 μm.

The invention extends in a second aspect to an aqueous medium (which may be an emulsion) or solid material comprising a composition according to the first aspect of the invention.

The cellulose platelets within the aqueous medium may absorb water such that they swell. The cellulose platelets may absorb sufficient water to be 98% water by volume whilst retaining their structural integrity. An aqueous medium comprising swollen cellulose platelets may have a higher viscosity than a similar aqueous medium comprising cellulose platelets that are not swollen, or are not capable of becoming swollen.

According to a third aspect of the invention there is provided a method of preparing the composition according to the first aspect of the invention, comprising the steps of;
    providing a vegetable material pulp;
    treating the vegetable material pulp with at least 0.1M alkaline metal hydroxide;
    heating the vegetable material pulp and homogenising the vegetable material pulp at low shear;
    filtering, then reducing the water content of the resultant composition;
    characterised by pressing the composition, while allowing the composition to expand laterally, to reduce the water content of the composition.

It has been found that allowing the composition to expand laterally whilst being pressed allows the cellulose platelets within the composition to be reoriented such that the structure of the cellulose platelets is not damaged or changed during pressing at the first pressure. The inventors have found that it is important to retain the structure of the cellulose platelets to ensure that the composition may be resuspended within an aqueous medium after pressing. Therefore, the composition formed using the above method may be pressed to a concentration as of at least 20% solids whilst still being able to subsequently resuspend the cellulose platelets in aqueous media.

Accordingly, the method of the present aspect of the invention produces a composition of cellulose platelets that is concentrated to at least 20% solids that may be then be added in small quantities to aqueous media to modify the properties of the said media. The high concentration of the composition allows the composition to occupy a smaller volume than other such compositions, and therefore reduces the costs for storage and transportation of the composition. In addition, the higher concentration of cellulose platelets allows a smaller amount to be added to any given aqueous medium to provide the desired properties, and thereby reducing the amount that aqueous medium is diluted by.

Preferably, the cellulose platelets of the composition are generally planar and the pressure which is applied while the composition is pressed is such that platelets align themselves to at least some extent during pressing. The cellulose platelets will thereby align to at least some extent in the plane which is normal to the applied pressure.

Prior to the step of pressing the composition, a surfactant or dispersant may be added. The surfactant or dispersant may bind to the cellulose platelets within the composition and inhibit formation or inter-platelet bonds being formed and therefore inhibit aggregation of the cellulose platelets. The surfactant or dispersant may be Span 20, for example.

A surfactant or dispersant may be added to the composition after or during the step of homogenisation. A surfactant or dispersant may be added to the composition prior to or during the step of filtering. A surfactant or dispersant may be added to the composition between the steps of homogenisation and filtering.

The step of filtering may allow unwanted species present within the composition to be washed from the composition. A surfactant or dispersant added prior to the step of filtering may bind to unwanted species to allow the unwanted species to be more readily washed from the composition.

Prior to the step of pressing the composition, the exposed or available hydroxyl (OH) groups of the glucose residues may be functionalised by reacting them with a functionalising agent. For example, a halogenated silane such as chlorosilane may be added to the composition to form silane groups on some or all of the exposed or available OH groups.

The composition may have a cellulose platelets concentration of 1 to 8% solids content by weight immediately prior to the step of reacting exposed or available hydroxyl groups of the glucose residues with a functionalising agent.

A functionalising agent may be added to the composition after the step of homogenisation. A functionalising agent may be added to the composition prior to the step of filtering. A functionalising agent may be added to the composition prior to the step of pressing. A functionalising agent may be added to the composition between the steps of homogenisation and filtering. A functionalising agent may be added to the composition between the steps of filtering and pressing.

Preferably, the method comprises pressing the composition, while allowing the composition to expand laterally, at a first pressure for a period of at least ten minutes: and then pressing the composition at a second, higher pressure to further remove the water content of the composition.

Preferably, the water content of the composition is reduced by wicking. The water content of the composition may be reduced by evaporation.

Preferably, the first pressure at which the composition is pressed is less than 2 kg/cm$^2$. The first pressure at which the composition is pressed may be less than 1.5 kg/cm$^2$.

The composition may be pressed to a sheet of thickness of less than 5 mm. Preferably, the composition is pressed to a thickness of less than 2 mm.

The vegetable material pulp may be heated to at least 80° C. Preferably, the vegetable material pulp is heated to at least 90° C. Preferably, the vegetable material pulp is heated to less than 100° C.

The use of relatively low temperatures allows the vegetable material pulp to be processed with the use of less energy and therefore at a lower cost than methods known in the art employing higher temperatures. In addition, low use of temperatures and pressures ensures that minimum cellulose nanofibers are produced. Cellulose nanofibers affect the viscosity of the composition and make it more difficult to rehydrate the composition after dehydration.

The alkaline metal hydroxide may be sodium hydroxide. The alkaline metal hydroxide may be potassium hydroxide. The alkaline metal hydroxide may be at a concentration of at least 0.5M.

It has been found that the use of alkaline metal hydroxides, especially sodium hydroxide, in the above method, is necessary to remove sufficient pectin from the cellulose platelets, allowing the pores within the cellulose platelets to open up and thereby form additional pathways for water molecules to enter into and through the cellulose platelets upon rehydration. In this way the cellulose platelets are allowed to swell upon rehydration and resulting in an increased viscosity of the aqueous medium within which the cellulose platelets are rehydrated.

Preferably, the step of homogenisation at low shear is carried out for at least five minutes. The step of homogenisation at low shear may be followed by a step of homogenisation at higher shear. It has been found that it is important to the homogenise at low shear before homogenising at high shear to break the pulp down into individual cells, which are then in turn broken up into cellulose platelets. Typically, the cellulose platelets so-formed are at least half the size of the parent cells. The cellulose platelets may be one fifth the size of the parent cells. The cellulose platelets may be one tenth the size of the parent cells.

For example, for parent cells having a major dimension of 500 μm, the cellulose platelets may have a major dimension of 250 μm, 100 μm or 50 μm.

Typically, at least 50% of the cellulose platelets within a composition of cellulose platelets may have a major dimension between 20 and 90 μm. At least 70% of the cellulose platelets within a composition of cellulose platelets may have a major dimension between 20 and 90 μm. Preferably, at least 50% of the cellulose platelets within a composition of cellulose platelets have a major dimension between 30 and 80 μm. More preferably, at least 70% of the cellulose platelets within a composition of cellulose platelets have a major dimension between 30 and 80 μm.

Preferably, less than 1%, or more preferably less than 0.1% or less than 0.01% by dry weight of the cellulose within the composition is in the form of microfibrillised cellulose. This is important as microfibrillated cellulose substantially inhibits rehydration.

Preferably, following the step of pressing, the composition is added to an aqueous medium and the cellulose platelets within the composition are rehydrated and uniformly suspended within the aqueous medium under low shear mixing.

Rehydration under low shear mixing ensures that the energy cost to rehydrate is low and that the cellulose platelets are not damaged, or that a significant proportion of the cellulose platelets are not damaged during the mixing process.

DESCRIPTION OF THE DRAWINGS

An example embodiment of the present invention will now be illustrated with reference to the following Figures in which.

DETAILED DESCRIPTION OF EXAMPLE EMBODIMENT

Figure 1:
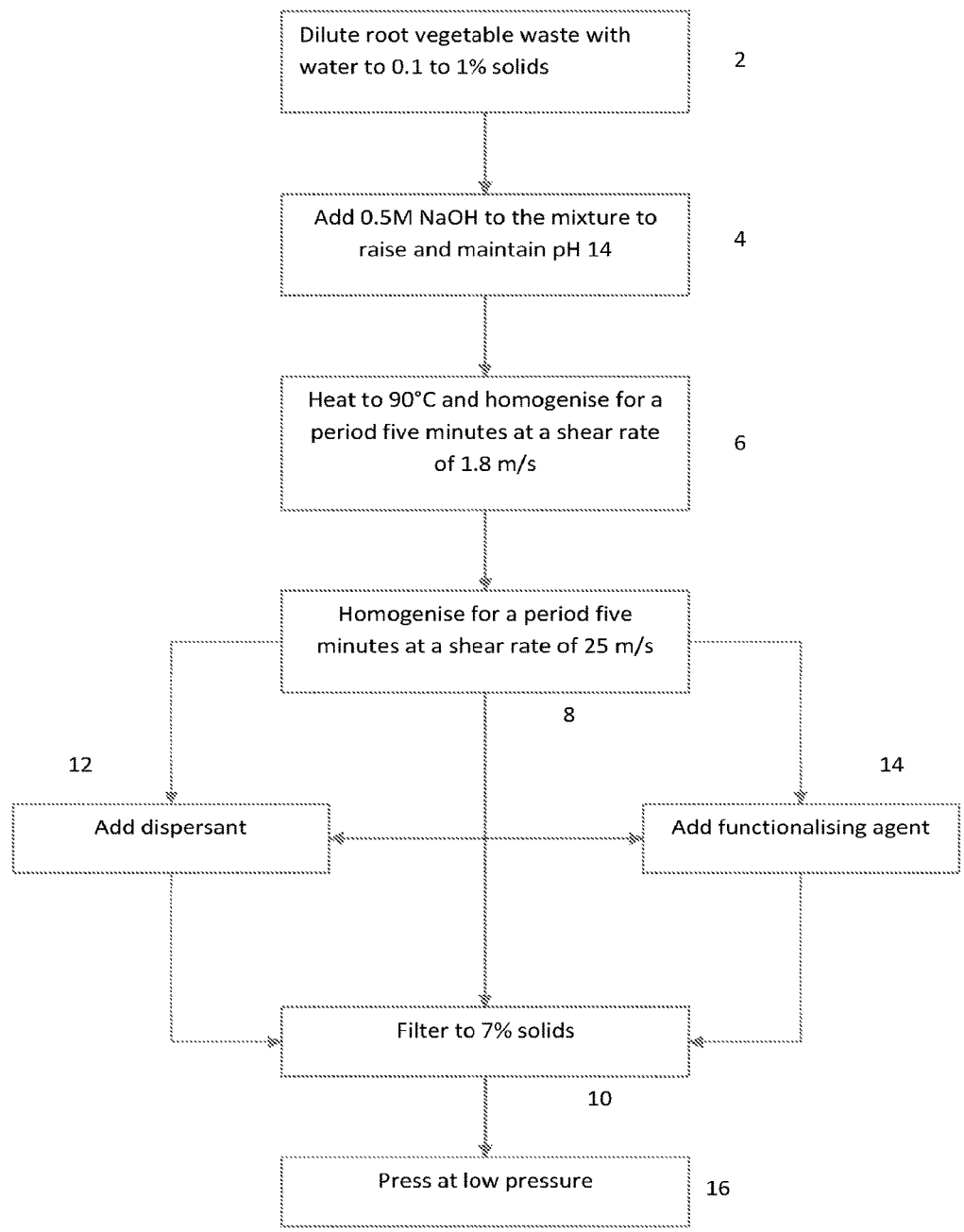
FIG. 1 is a flow diagram of the method of producing a composition of cellulose platelets.
Figure 2A:
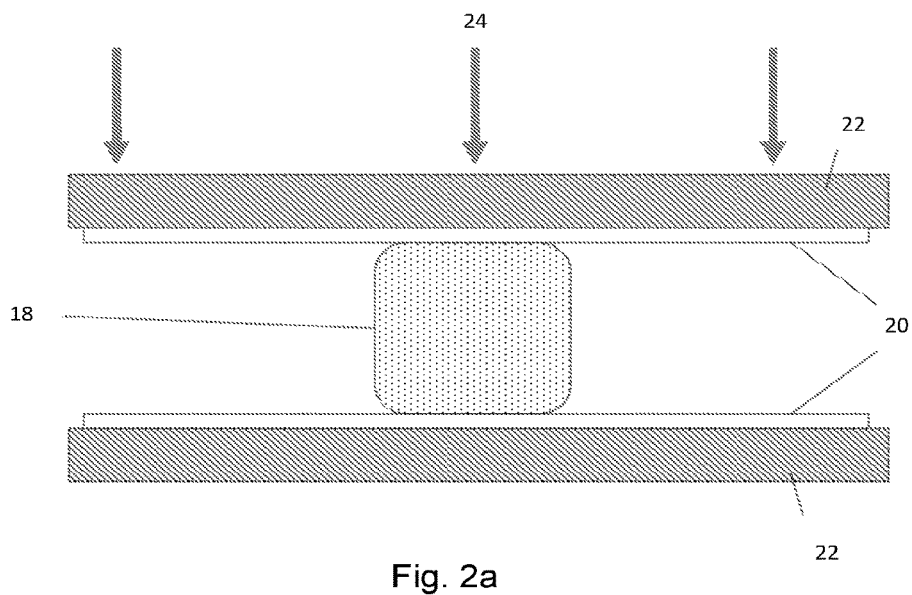
FIG. 2A is a side view of the step of pressing the composition to reduce the water content whilst allowing the composition to spread laterally (FIG. 2B)
Figure 2B:
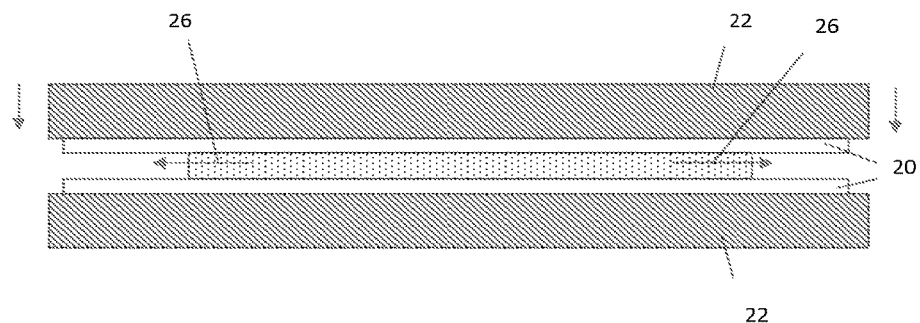
Figure 3A:
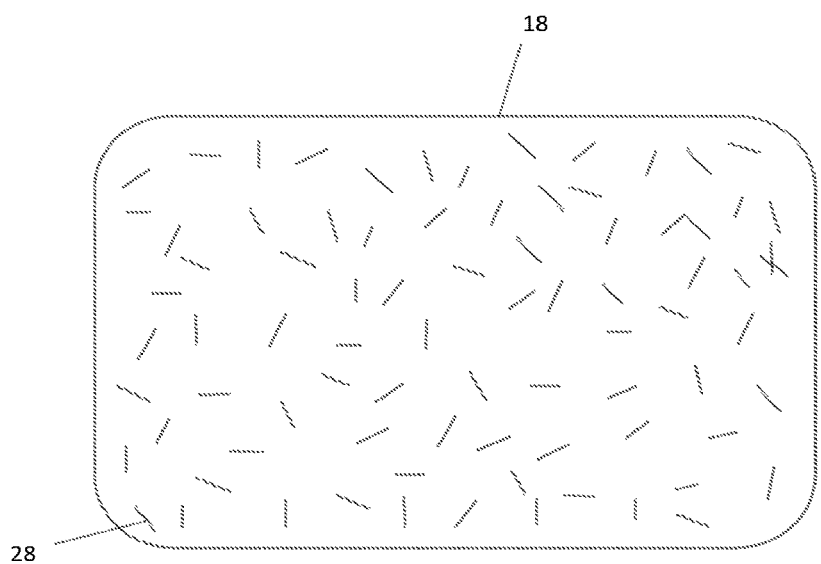
FIG. 3A and FIG. 3B are schematic diagrams showing the cellulose platelets oriented randomly before pressing (FIG. 3A) and that during pressing the cellulose platelets reorient themselves (FIG. 3B)
Figure 3B:
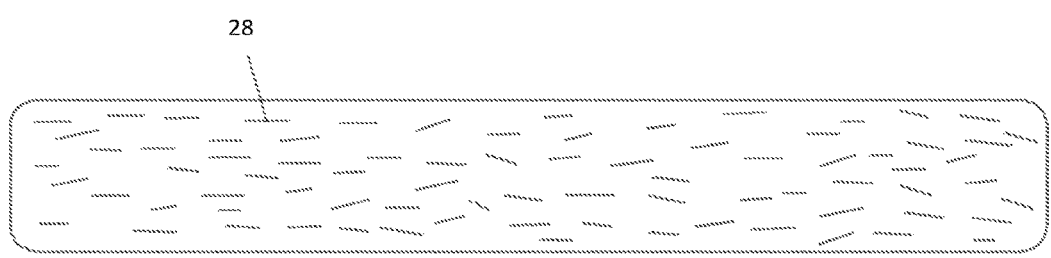

With reference to FIGS. 1 to 4, a composition of cellulose platelets according to the invention is produced in the following manner.

Root vegetable waste, such as carrot or sugar beet from existing industrial processes, is processed to form a mixture having a concentration of between 0.1% and 10% solids content by weight (2) in water. 0.5M sodium hydroxide (NaOH) is added to the solution, raising and maintaining the pH of the solution at pH 14 (4). The addition of the NaOH extracts a significant proportion of hemicellulose and the majority of pectin from the cellulose of the cells within the mixture.

The mixture is then heated to 90° C. for five hours and homogenised for periodically during the heating period for a total of one hour with a mixer blade rotating at a rate of 11 m/s (6), followed by homogenisation for a period of five minutes, at the end of the heating period, with a mixer blade rotating at a rate of 30 m/s (8). Homogenisation separates the cells along the line of the middle lamella, then breaks the separated cells into platelets. The resultant cellulose platelets are approximately 10 times smaller than the original separated cells.

The resultant mixture is then filtered to remove the dissolved materials to a solids content of less than 8% by weight (10).

Span 20 ("Span" is a registered trade mark of Croda International PLC, Goole UK), a dispersant, is then added to the mixture (12) and coats the surface of the cellulose platelets and prevents the cellulose platelets aggregating, allowing them to be more readily re-dispersed in aqueous media.

The composition so-formed has a solids content by weight of around 4 to 8% and forms a thick paste. To reduce the water content further, it is necessary to press the composition (16).

A small volume of the composition (18) is placed between two absorbent sheets (20) covering the interior surface of two spaced-apart metal plates (22). The absorbent sheets are able to remove water from the material by a wicking action as the material is compressed. The upper metal plate then exerts a low pressure onto the top surface of the material (24). The material is allowed to expand laterally (26) between the absorbent sheets as the pressure is applied to form a thin sheet of material approximately 2 mm or less thick. As the composition is compressed, water is wicked out by the absorbent sheets, thereby reducing the water content of the composition.

This has been found to allow the cellulose platelets (28) within the material to be reoriented normal to the direction of the applied force within the composition (see FIG. 3b) and thereby preserving their shape and structure, reducing aggregation and thereby allowing the composition to be readily redispersed in aqueous media.

The resulting sheets of material are then cut into suitable sized small pieces whilst ensuring that the material is not compressed, sheared or rolled during cutting otherwise the porosity of the platelets along with their flat shape can be compromised.

Compositions made using the above method typically comprise up to 25 to 35% solids of cellulose platelets by weight.

Figure 4:
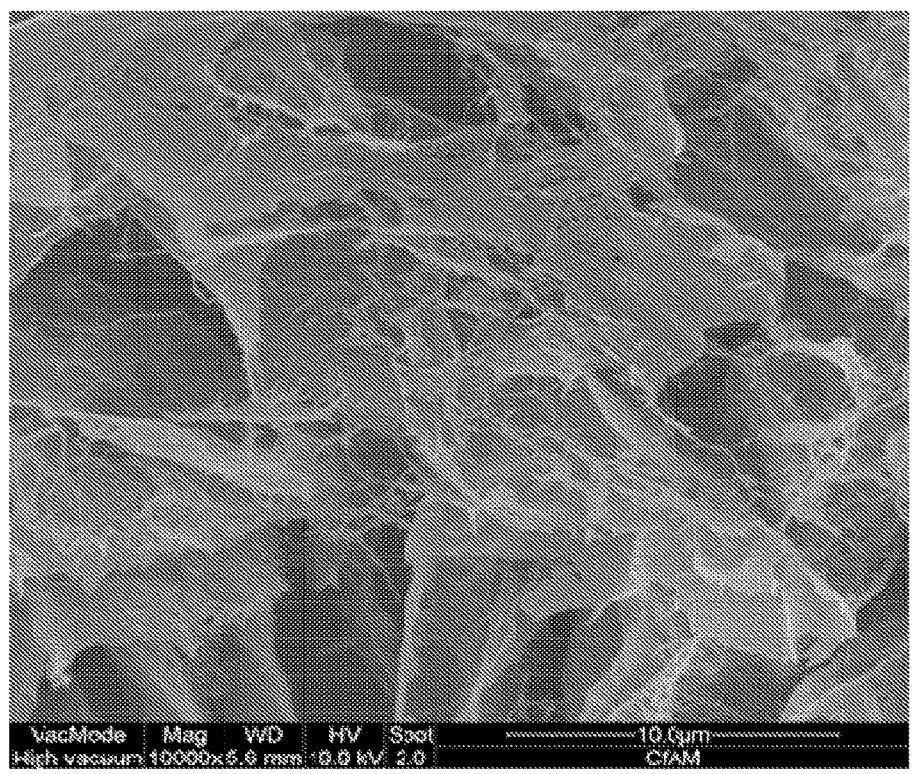
FIG. 4 is a scanned electron micrograph of the surface of multiple cellulose platelets.

The surface of some multiple cellulose platelets made by the above method are shown in FIG. 4. In an example composition, the cellulose platelets are on average 50 μm in diameter and 0.25 μm thick. A 3% solids suspension in water of these cellulose platelets results in an aqueous medium exhibiting extreme shear-thinning behaviour characterised by very low power-law indexes of 0.067 to 0.107. The cellulose platelets comprise pores of up to 0.2 μm in diameter that allow water to enter into the interior of the cellulose platelets and results in the cellulose platelets swelling when fully hydrated. The cellulose platelets comprise 79% cellulose by dry weight, the remaining 21% predominantly comprising hemicellulose and a small amount (less than 5%) of pectin.

Previous cellulose sections or fragments used as additives in the art typically have less than 0.5 H atoms available per glucose residue due to hydrogen bonds forming between OH groups from adjacent glucose residues, or glucose residues of opposing portions of the cellulose fragment/section. The resultant hydrogen bonds prevent the cellulose fragments/sections from being fully rehydrated after concentration.

The glucose residues of the cellulose within the cellulose platelets have been found to have a high number of OH groups that may be available. The cellulose platelets atoms available in the above example composition is 1.5 H atoms available per glucose residue.

Such high numbers of available OH groups allows the cellulose platelets to be highly hydrated and allows a high degree of functionalization, as desired.

An example of use of the described composition will now be described.

The composition may be used as an additive to a material or formulation to alter existing properties of the material or formulation, or to provide additional properties to them.

For example, the composition may be added to a paint, such as a water based epoxy primer paint, to increase the rheology of the formulation. An example of such a formulation is given below.

A red iron oxide anti-corrosive water-based epoxy primer is made by mixing two components (an epoxy resin and a curing agent). The first component, which contains the composition of the present invention, is made using the following method (quantites are given in the following table):

The first part of the primer is made from an epoxy resin dispersion (Beckopox EP 2384w/57WA Epoxy Resin Dispersion, from Cytec Industries Inc. of New Jersey, USA) is initially well mixed with de-ionised water, pigment dispersant (Disperbyk 190 pigment dispersant, from BYK-Chemie of Wessel, Germany) and a defoaming agent (additol VXW-6393 defoamer, from Cytec Industries).

Then pigments (RO-4097 red iron oxide and Halox SZP-391 anti-corrosive pigment from Halox Pigments of Indiana, USA), and further additives (barium sulphate, from Gammaco, Inc. of Bangkok Thailand, 10ES wollastocoat treated wollastonite, from Nyco Minerals of New York, USA, Zeeosphere 400 ceramic microspheres, from Zeeosphere Ceramics of Los Angeles, USA, and 325 mesh water ground mica, from Zemex Minerals) are added and dispersed to a texture of 4 to 5 North Score on the higman grind gauge (equivalent to 38.1 to 50.8 μm).

The formulation is then mixed well at 2200 rpm for approximately 30 minutes with further epoxy resin dispersion (of the same type as before), defoamer and the composition of the present invention.

Further additives and de-ionised water are then added to the formulation (BYK 348 substrate wetting agent, from BYK-Chemie, and 10% Cotrol AMB ammonium benzoate, from Vertellus, Inc. of Indianapolis, USA).

The second component is made by diluting an epoxy curing agent (Beckopox VEH 2188x/55WA Epoxy Curing Agent, from Cytec Industries) in deionised water.

The first and second components are then mixed to allow the formulation to be applied to a substrate and cured to form a hardened material, suitable for protective coatings, for example.

Part A

| Component | Imperial weight (lbs) | volume (G) | Metric weight (kg) | volume (l) |
|---|---|---|---|---|
| Beckopox EP 2384w/57WA Epoxy Resin Dispersion | 152.40 | 16.78 | 69.13 | 76.28 |
| De-ionised water | 52.70 | 6.33 | 23.90 | 28.78 |
| Disperbyk 190 Pigment Dispersant | 11.50 | 1.31 | 5.22 | 5.96 |
| Additol VXW-6393 Defoamer | 4.00 | 0.50 | 1.81 | 2.27 |
| RO-4097 Red Iron Oxide | 75.00 | 1.84 | 34.02 | 8.36 |
| Halox SZP-391 Anti-Corrosive Pigment | 50.00 | 2.14 | 22.68 | 9.73 |
| Barium Sulphate | 100.00 | 2.73 | 45.36 | 12.41 |
| 10ES Wollastocoat Treated Wollastonite | 150.00 | 6.20 | 68.04 | 28.19 |
| Zeeosphere 400 Ceramic Microspheres | 101.00 | 5.05 | 45.81 | 22.96 |
| 325 mesh Water Ground Mica | 7.50 | 0.32 | 3.40 | 1.45 |
| Beckopox EP 2384w/57WA Epoxy Resin Dispersion | 286.20 | 31.52 | 129.82 | 143.29 |
| Additol VXW-6393 Defoamer | 4.00 | 0.52 | 1.81 | 2.36 |
| Curran(R) thixC70 Rheology Modifier | 2.50 | 0.27 | 1.13 | 1.23 |
| De-Ionized Water | 40.00 | 4.80 | 18.14 | 21.82 |
| BYK 348 Substrate Wetting Agent | 5.00 | 0.57 | 2.27 | 2.59 |
| 10% Cotrol AMB Ammonium Benzoate | 40.00 | 4.70 | 18.14 | 21.37 |
| Total | 1081.80 | 85.58 | 490.70 | 389.05 |

Part B

| Component | Imperial weight (lbs) | volume (G) | Metric weight (kg) | volume (l) |
|---|---|---|---|---|
| Beckopox VEH 2188w/55WA Epoxy Curing Agent | 160.8 | 17.87 | 72.94 | 81.24 |
| De-Ionised Water | 27.7 | 3.33 | 12.56 | 15.14 |
| De-Ionised Water Reduction to 80 Krebs Units | 53 | 6.36 | 24.04 | 28.91 |
| Total | 241.5 | 27.56 | 109.54 | 125.29 |

Figure 5:
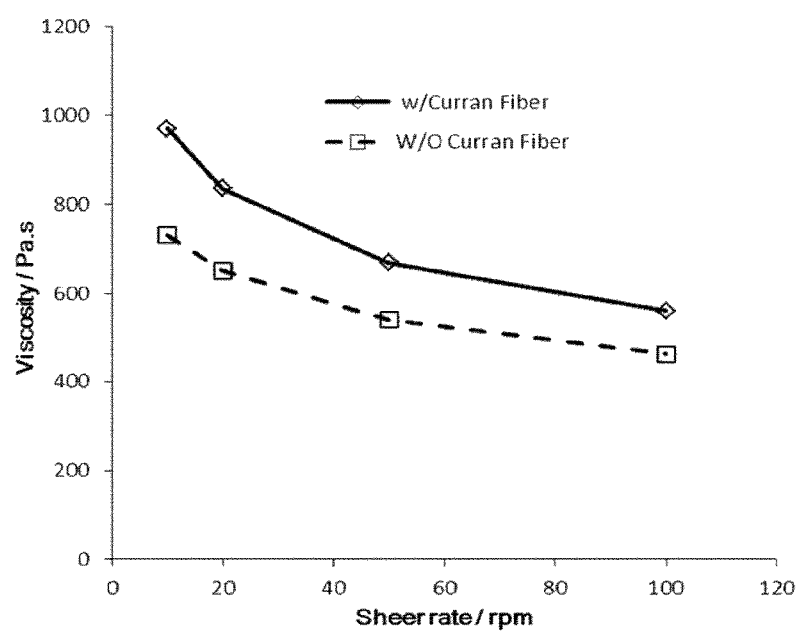
FIG. 5 is a plot of viscosity versus sheer.

The dry fiber level of the composition of the present invention within the final formulation comprises only 0.047% and yet, with reference to FIG. 5, the resultant viscosity of the formulation with the composition of the invention is approximately a third greater than for a formulation without, at 10 rpm.

A paint formulation with a higher loading of the cellulose platelets (greater than that given in the above example) has been made which gives the paint its required rheology while at the same time imparting improved hardness and increased crack resistance during drying of the paint.

Further variations and modifications may be made within the scope of the invention herein disclosed.

What is claimed:

1. A composition comprising cellulose platelets comprising at least 60% cellulose by dry weight, less than 10% pectin by dry weight and at least 5% hemicellulose by dry weight, wherein the cellulose platelets have a median major dimension of between 40 and 200 µm.

2. The composition according to claim 1, wherein the cellulose platelets have a median major dimension of between 60 and 150 µm.

3. The composition according to claim 2, wherein the cellulose platelets comprise at least 10% hemicellulose by dry weight.

4. The composition according to claim 1, wherein the cellulose platelets comprise at least 10% hemicellulose by dry weight.

5. A composition comprising cellulose platelets comprising at least 60% cellulose by dry weight, less than 10% pectin by dry weight and at least 5% hemicellulose by dry weight, wherein at least 70% of the cellulose platelets have a major dimension between 30 and 80 µm.

6. The composition according to claim 5, wherein the cellulose platelets comprise at least 10% hemicellulose by dry weight.

\* \* \* \* \*